United States Patent
Duzly et al.

(10) Patent No.: US 9,940,039 B2
(45) Date of Patent: Apr. 10, 2018

(54) METHOD AND DATA STORAGE DEVICE WITH ENHANCED DATA RETENTION

(71) Applicant: Western Digital Technologies, Inc., San Jose, CA (US)

(72) Inventors: Yacov Duzly, Raanana (IL); Christopher Scott Moore, Redwood City, CA (US); Karin Alicia Werder, San Jose, CA (US); Elad Baram, Sunnyvale, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 88 days.

(21) Appl. No.: 14/718,270

(22) Filed: May 21, 2015

(65) Prior Publication Data

US 2016/0342347 A1    Nov. 24, 2016

(51) Int. Cl.
*G06F 12/00*   (2006.01)
*G06F 3/06*    (2006.01)
*G06F 12/02*   (2006.01)

(52) U.S. Cl.
CPC ............ *G06F 3/0619* (2013.01); *G06F 3/064* (2013.01); *G06F 3/065* (2013.01); *G06F 3/0616* (2013.01); *G06F 3/0679* (2013.01); *G06F 12/0238* (2013.01); *G06F 12/0246* (2013.01); *G06F 2212/72* (2013.01); *G06F 2212/7206* (2013.01); *G06F 2212/7207* (2013.01)

(58) Field of Classification Search
CPC ...... G06F 3/0619; G06F 3/0616; G06F 3/065; G06F 3/0653; G06F 3/0679
See application file for complete search history.

(56) References Cited

U.S. PATENT DOCUMENTS

| 6,385,721 | B1 | 5/2002 | Puckette |
| 7,634,592 | B2 | 12/2009 | Kadatch et al. |
| 2014/0006688 | A1* | 1/2014 | Yu .......................... G11C 16/10 711/103 |
| 2014/0281151 | A1 | 9/2014 | Yu et al. |
| 2015/0067242 | A1* | 3/2015 | Kuroki .................. G06F 9/4406 711/103 |

* cited by examiner

*Primary Examiner* — Shawn X Gu
(74) *Attorney, Agent, or Firm* — Patterson & Sheridan, LLP

(57) ABSTRACT

A data retention operation is performed in a non-volatile memory in response to detection of a triggering event. The data retention operation includes updating a value of a write parameter of the non-volatile memory and storing into the non-volatile memory at least one copy of contents of a boot portion of the non-volatile memory using the updated value of the write parameter. The updated value of the write parameter increases retention of stored data during extended periods of inactivity at the non-volatile memory.

26 Claims, 6 Drawing Sheets

METHOD AND DATA STORAGE DEVICE WITH ENHANCED DATA RETENTION

FIELD OF THE DISCLOSURE

This disclosure is generally related to data storage devices and more particularly to storing data for enhanced data retention.

BACKGROUND

Non-volatile storage devices such as flash memory devices have enabled increased portability of data and software applications. Electronic devices such as mobile phones, typically use non-volatile storage devices, such as flash memory devices, for persistent storage of information, such as data and program code that is used by the electronic device. Advances in technology have resulted in increased storage capacities of non-volatile storage devices with reductions in storage device size and cost.

Non-volatile storage devices are conventionally configured to verify integrity of stored data and to preform remedial actions to prevent data corruption. However, if a non-volatile storage device is inactive for an extended period of time, such as in a mobile phone that remains powered off for a number of years, "data retention" errors may accumulate in the stored data due to mechanisms such as charge leakage from memory cells. If a number of accumulated errors exceeds an error correction capability of the non-volatile storage device, there is a risk that the mobile phone may not be able to boot properly when powered on. As a result, non-volatile storage devices are typically designed to ensure data integrity for a specified "worst case" period of inactivity. However, design decisions that enhance data retention of a non-volatile storage device may adversely affect performance characteristics (e.g., latency of data write operations) and endurance characteristics (e.g., "wear" of storage elements that reduces a useful life of the non-volatile storage device) of the non-volatile storage device.

DETAILED DESCRIPTION

Figure 1:
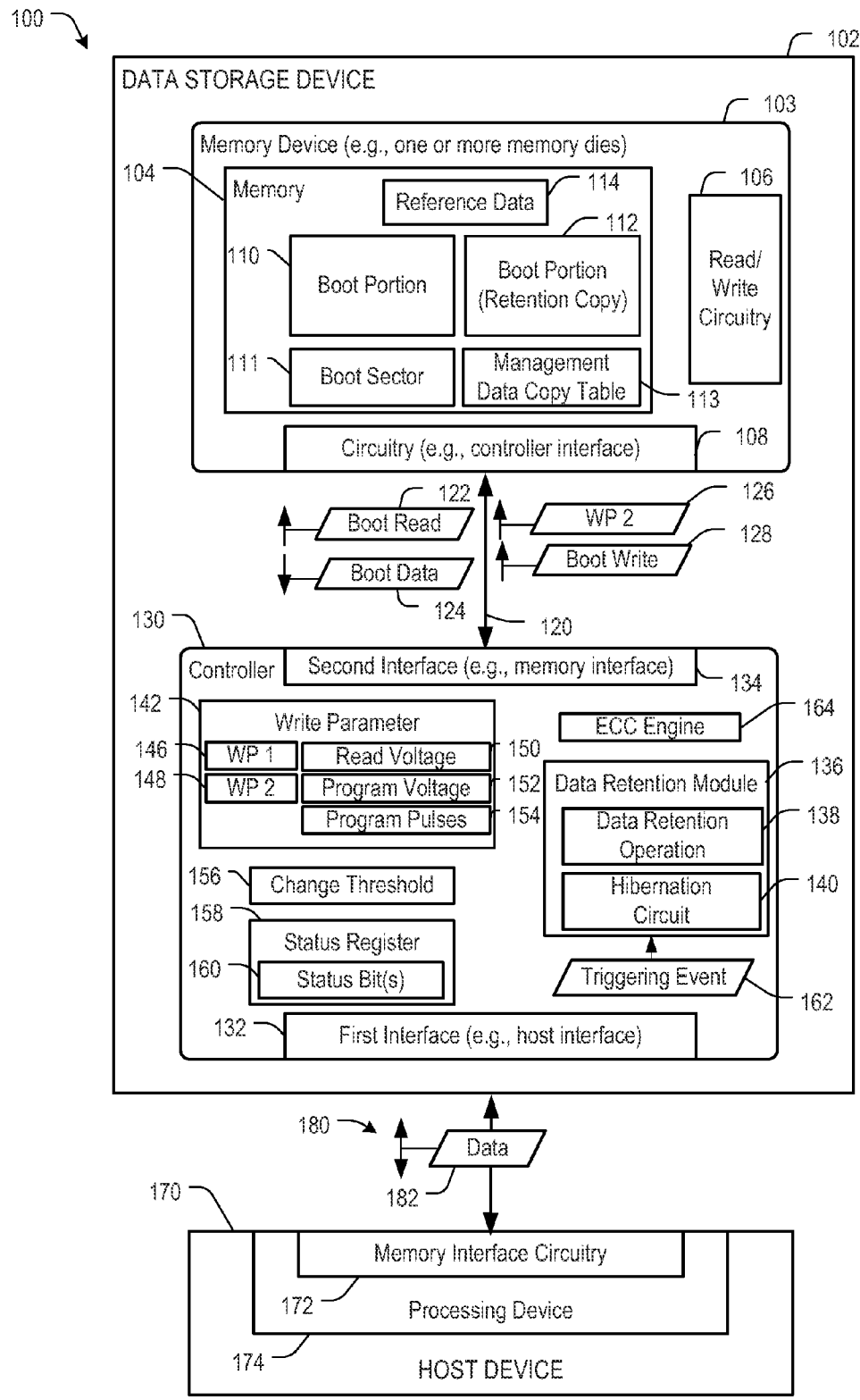
FIG. 1 is a block diagram of a particular illustrative embodiment of a system including a data storage device having a data retention module.

A data storage device having a non-volatile memory may be configured to perform a data retention operation in response to an impending period of non-use of the data storage device. The data retention operation may adjust one or more data storage parameters to values that promote increased data retention in the non-volatile memory and may use the adjusted values to store one or more copies of "important" program code, data structures, or a combination thereof. The resulting copies may have enhanced data retention properties as compared to data that is stored using unadjusted data storage parameter values. As used herein, "enhanced data retention" may indicate that stored data exhibits a reduced amount of data corruption (e.g., fewer bit errors in the data read from storage) after a period of time has lapsed since storage of the data, as compared to an amount of corruption after the same period of time of other data that does not have enhanced data retention. Alternatively, or in addition, "enhanced data retention" may indicate that stored data remains error-free (e.g., the stored data is readable from storage without any bit errors) for a longer period of time since storage of the data, as compared to a length of time that other data (without enhanced data retention) remains error-free after storage.

For example, in a flash memory device, the data retention operation may adjust a programming "trim" by increasing verify voltages and read voltages to more easily distinguish between states of flash memory storage elements after charge leakage from the floating gates of storage elements has occurred due to passage of time. Other program trim adjustments can include increasing a number of programming pulses that are applied to write data to storage elements and decreasing a voltage of each pulse to more precisely set a threshold voltage of the storage elements during a write operation. After adjusting the program trim, contents of a boot portion of the data storage device may be re-written into the boot portion and one or more additional backup copies of the contents of the boot portion may be written into the data storage device to increase a likelihood of recovery of the boot portion contents after a prolonged period of non-use. Other data structures, such as flash management tables, may also be re-written and/or additional backup copies stored using the adjusted program trim.

Using the unadjusted program trim during normal operation and the adjusted program trim in anticipation of a prolonged period of inactivity provides design flexibility and reduces compromises between parameter values that improve device performance and endurance (e.g., lower verify voltages, fewer program pulses with higher pulse voltages) and parameter values that improve data retention (e.g., higher verify voltages, more program pulses with lower pulse voltages). As a result, a data storage device may operate with enhanced device performance during normal operation without reducing the ability of the data storage device to remain functional after a "worst case" period of inactivity has occurred.

Particular aspects of the present disclosure are described below with reference to the drawings. In the description, common features are designated by common reference numbers.

FIG. 1 depicts an illustrative example of a system 100 that includes a data storage device 102 and an access device 170 (e.g., a host device). The data storage device 102 is configured to perform a data retention operation 138 in response to detecting a triggering event 162 that indicates a prediction or determination of an extended period of inactivity. The data retention operation 138 may generate one or more copies of boot code and/or data structures that are stored in a memory 104 in a manner that provides enhanced data retention during the extended period of inactivity.

The access device 170 may be coupled to the data storage device 102 via a communication channel 180, such as a bus. The access device 170 may include memory interface circuitry 172, such as a bus interface, that is configured to enable communications with the data storage device 102 via the communication channel 180. The access device 170 may also include a processing device 174, such as an application processor.

The access device 170 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The access device 170 may operate in compliance with a JEDEC Solid State Technology Association industry specification, such as an embedded MultiMedia Card (eMMC) specification or a Universal Flash Storage (UFS) Host Controller Interface specification. The access device 170 may operate in compliance with one or more other specifications, such as a Secure Digital (SD) Host Controller specification as an illustrative example. Alternatively, the access device 170 may communicate with the data storage device 102 in accordance with another communication protocol. In some implementations, the system 100, the data storage device 102, or a memory 104 of the data storage device 102 may be integrated within a network-accessible data storage system, such as an enterprise data system, a network-attached storage (NAS) system, or a cloud data storage system, as illustrative examples.

The data storage device 102 may include a memory device 103 that is coupled to a controller 130 via a bus 120 or other communication channel. The memory device 103 may include one or more memory dies (e.g., one memory die, two memory dies, eight memory dies, or another number of memory dies), read/write circuitry 106, and other circuitry 108, such as controller interface circuitry. The memory device 103 includes the memory 104, such as a non-volatile memory of storage elements included in a memory die of the memory device 103. For example, the memory 104 may include a flash memory, such as a NAND flash memory, or a resistive memory, such as a resistive random access memory (ReRAM), as illustrative examples. The memory 104 may have a three-dimensional (3D) memory configuration. As an example, the memory 104 may have a 3D vertical bit line (VBL) configuration. In a particular implementation, the memory 104 is a non-volatile memory having a 3D memory configuration that is monolithically formed in one or more physical levels of arrays of memory cells having an active area disposed above a silicon substrate, and the memory 103 includes circuitry (e.g., the read/write circuitry 106) associated with operation of the memory cells. Alternatively, the memory 104 may have another configuration, such as a two-dimensional (2D) memory configuration or a non-monolithic 3D memory configuration (e.g., a stacked die 3D memory configuration).

The memory 104 may include one or more regions of storage elements. An example of a storage region is a block, such as a NAND flash erase group of storage elements. Another example of a storage region is a word line of storage elements, such as a word line. A word line may function as a single-level-cell (SLC) word line, as a multi-level-cell (MLC) word line, or as a tri-level-cell (TLC) word line, as illustrative examples. Each storage element of the memory 104 may be programmable to a state (e.g., a threshold voltage in a flash configuration or a resistive state in a resistive memory configuration) that indicates one or more values. As an example, in an illustrative TLC scheme, each storage element of a word line may be programmable to a state that indicates three values. As an additional example, in an illustrative MLC scheme, each storage element of a word line may be programmable to a state that indicates two values.

The memory 104 includes a boot portion 110. As described in further detail with respect to FIG. 2, the boot portion 110 may store "boot data," such as executable instructions, configuration data, and/or other information that may be retrieved during a boot process of the data storage device 102, a boot process of the access device 170, or a combination thereof. The boot portion 110 may include a controller boot block that stores executable code that is executable by a processor of the controller 130 to load configuration and storage information during power up of the data storage device 102. For example, the controller boot block may include storage elements at a memory address location that is accessed by the controller 130 upon detection of a power up operation and may store instructions that are executable by the controller 130 to load management data and/or other configuration data or instructions. The memory 104 may also include a boot sector 111, such as a master boot sector, that includes one or more pointers to boot partitions, such as a pointer to the boot portion 110, and may include a counter of boot copies. The memory device 103 may store contents of the boot sector 111 and the boot portion 110 using an SLC configuration to provide enhanced data integrity as compared to MLC or TLC configurations. As described in further detail with respect to FIG. 2, the boot portion 110 may include an access device boot partition that stores data and/or executable code that is retrievable by the access device 170 upon boot of the access device 170 to initialize the processing device 174.

The controller 130 includes a first interface 132 (e.g., a host interface), a second interface 134 (e.g., a memory interface), a data retention module 136, a status register 158, and an ECC engine 164. The controller 130 is configured to receive data and instructions from the access device 170 using the first interface 132, such as data 182 received from the access device 170. To illustrate, the data 182 may include one or more files (e.g., an image file, an audio file, and/or a video file, as illustrative examples) to be stored at the data storage device 102. As another example, the data 182 may include boot data to be retrieved by the access device 170 via the first interface 132 upon boot of the access device 170.

The controller 130 is configured to send data and commands to the memory device 103 and to receive data from the memory device 103 via the second interface 134, such as a serial advanced technology attachment (SATA) or peripheral component interface express (PCIe) interface as illustrative, non-limiting examples. For example, the controller 130 is configured to send data and one or more write commands to cause the memory device 103 to store the data to a specified address of the memory 104. The one or more write commands may specify a physical address of a portion of the memory 104 that is to store the data. As another example, the controller 130 is configured to send one or more read commands to cause the memory device 103 to read data from a specified address of the memory 104. For example, the specified address may correspond to an address of the boot portion 110.

The ECC engine 164 may include one or more encoders, such as a Hamming encoder, a Reed-Solomon (RS) encoder, a Bose-Chaudhuri-Hocquenghem (BCH) encoder, a low-density parity check (LDPC) encoder, a turbo encoder, an encoder configured to encode data according to one or more other ECC schemes, or a combination thereof. The ECC engine 164 may include one or more decoders, such as a Hamming decoder, an RS decoder, a BCH decoder, an LDPC decoder, a decoder configured to decode data according to one or more other ECC schemes, or a combination thereof.

The data retention module 136 is configured to detect the triggering event 162 and to initiate the data retention operation 138 in response to detecting the triggering event 162. For example, during "normal" (e.g., default) operation of the data storage device 102 prior to detection of the triggering event 162, data may be stored in the memory 104 using one or more first sets of write parameter values, such as a first value 146 of a write parameter 142. The first value 146 of the write parameter 142 may be configured to support one or more performance criteria during write and read operations at the memory device 103. A second value 148 of the write parameter 142 may be configured to provide enhanced data retention during periods of non-use of the data storage device 102. The data retention module 136 may include a hibernation circuit 140 that is configured to detect the triggering event 162 and to initiate the data retention operation 138 in response to detecting the triggering event 162. The hibernation circuit 140 may set one or more status bits 160 in the status register 158 in response to detecting completion of the data retention operation 138. For example, the status register 158 may be accessible to the access device 170 to enable the access device 170 to detect when the data retention operation 138 has been completed.

The write parameter 142 may correspond to a voltage level that indicates a program state of a storage element of the non-volatile memory 104, such as a programming verify voltage or read voltage 150. Alternatively or in addition, the write parameter 142 may correspond to a program pulse voltage 152 and/or a number of program pulses 154 used to set the program state of storages elements of the non-volatile memory 104.

The triggering event 162 may correspond to a signal received from the access device 170 to indicate that a period of extended non-use may occur. For example, the triggering event 162 may correspond to receipt of a dedicated instruction from the access device 170 that causes the data retention module 136 to initiate the data retention operation 138, as described in further detail with respect to FIG. 3. Alternatively or in addition, the controller 130 may originate the triggering event 162 via testing one or more conditions that may indicate a likelihood of an extended period of non-use of the data storage device 102. For example, the triggering event 162 may correspond to a detected amount of change in states of programmed storage elements of the memory 104 exceeding a change threshold 156. To illustrate, reference data 114 may be stored in the memory 104 and read by the controller 130 to determine whether a change in programmed voltage levels (e.g., due to charge loss since a time of programming the reference data 114) exceeds the change threshold 156. In response to determining that the change in programmed voltage levels exceeds the change threshold 156, the data retention module 136 may initiate the data retention operation 138.

During operation, the data storage device 102 may store data responsive to instructions from the access device 170 using the first value 146 of the write parameter 142. For example, the data storage device 102 may receive data and/or boot code from the access device 170 to be stored in the memory 104. The data storage device 102 may encode the received data and/or boot code at the ECC engine 164 to generate ECC codewords and may send the ECC codewords to the memory 104 for storage, such as at the boot portion 110. The data storage device 102 may also encode and store system information, such as controller boot code and/or management data, to the memory 104 (e.g., at the boot portion 110).

In response to detecting the triggering event 162, the data retention module 136 may initiate the data retention operation 138. For example, the data retention module 136 may send one or more boot read commands 122 to the memory device 103 to read contents of the boot portion 110 and may receive boot data 124 from the memory device 103. The boot data 124 may correspond to a representation of the contents of the boot portion 110 that matches data stored into the boot portion 110 or that differs from the data due to one or more bit errors. A decoding and error correction operation may be performed at the ECC engine 164 to correct any errors detected in the boot data 124 and to generate an error-corrected version of the boot data 124 (e.g., an ECC codeword that includes error-corrected contents of the boot portion 110).

The data retention module 136 may select the second value 148 of the write parameter 142 and may cause the second interface 134 to send a command 126 to the memory device 103 to use the second value 148 of the write parameter 142 for write operations. For example, the command 126 may cause the read/write circuitry 106 to adjust one or more voltage levels that are applied while programming data into storage elements of the memory 104. The data retention module 138 may cause the second interface 134 to send one or more write commands 128 to write the error-corrected version of the boot data 124 to the memory 104 to generate a "retention copy" 112 of the boot data 124 using the second value 148 of the write parameter 142. The retention copy 112 may provide enhanced retention of the boot data 124 in the event of an extended period of non-use of the data storage device 102. The boot sector 111 may also be re-written using the second value 148 of the write parameter 142 and may be updated to include a pointer to the retention copy 112. In some implementations, as described in further detail with respect to FIG. 2, one or more retention copies of management data that is used by the controller 130 may also be generated during the data retention operation 138, and a management data copy table 113 may be updated to include entries (e.g., addresses or pointers) that correspond to the one or more retention copies of the management data. In some implementations, the management data copy table 113 may be in the boot portion 110 and may also be updated using the second value 148 of the write parameter 142.

Upon completion of the data retention operation 138, the data retention module 136 may set values of the status bits 160 to indicate the data retention operation 138 is complete. Alternatively or in addition, the data storage device 102 may send a signal to the access device 170 indicating that the data storage device 102 has completed preparation for an extended period of inactivity. In response to the access device 170 receiving an indication that the data retention operation 138 has completed, such as by polling the status register 160 or receiving a signal or message from the data storage device 102, the access device 170 may cause the data storage device 102 to enter a hibernation or power down state. For example, the access device 170 may instruct the data storage device 102 to enter a hibernation state and/or may interrupt a supply of power that is provided to the data storage device 102 by the access device 170.

The access device 170 may restore power to the data storage device 102 after a period of inactivity (e.g., days, months, or years). In response to detecting a power-up event, the data storage device 102 may initiate a boot process that includes reading the retention copy 112 of the boot data 124 to initialize one or more processing devices or other components of the controller 130. In some implementations, the ECC engine 164 may perform an error correction operation to correct errors that may have occurred in the retention copy 112 to enable the controller 130 to complete the boot process. The access device 170 may also request to read an access device boot partition during a boot process of the processing device 174. In response, the controller 130 may read access device boot data from the retention copy 112, perform error correction at the ECC engine 164, and send an error-corrected version of the access device boot data to the access device 170.

By generating the retention copy 112 of the boot data 124 in response to the triggering event 162, extended data retention may be provided to protect contents of the boot portion 110 for a predicted extended period of inactivity (e.g., remaining in an unpowered or hibernation state) at the data storage device 102. Generating the retention copy 112 using the second value 148 of the write parameter 142 when an extended period of inactivity is predicted relaxes data retention design criteria for "normal" operations. As a result, the first value 146 of the write parameter 142 that is used for "normal" operations may be set to a value that enhances performance and/or endurance, enabling increased performance and/or endurance of the memory 104 during day-to-day use as compared to using a value that satisfies data retention design criteria for "worst case" periods of inactivity.

Figure 2:
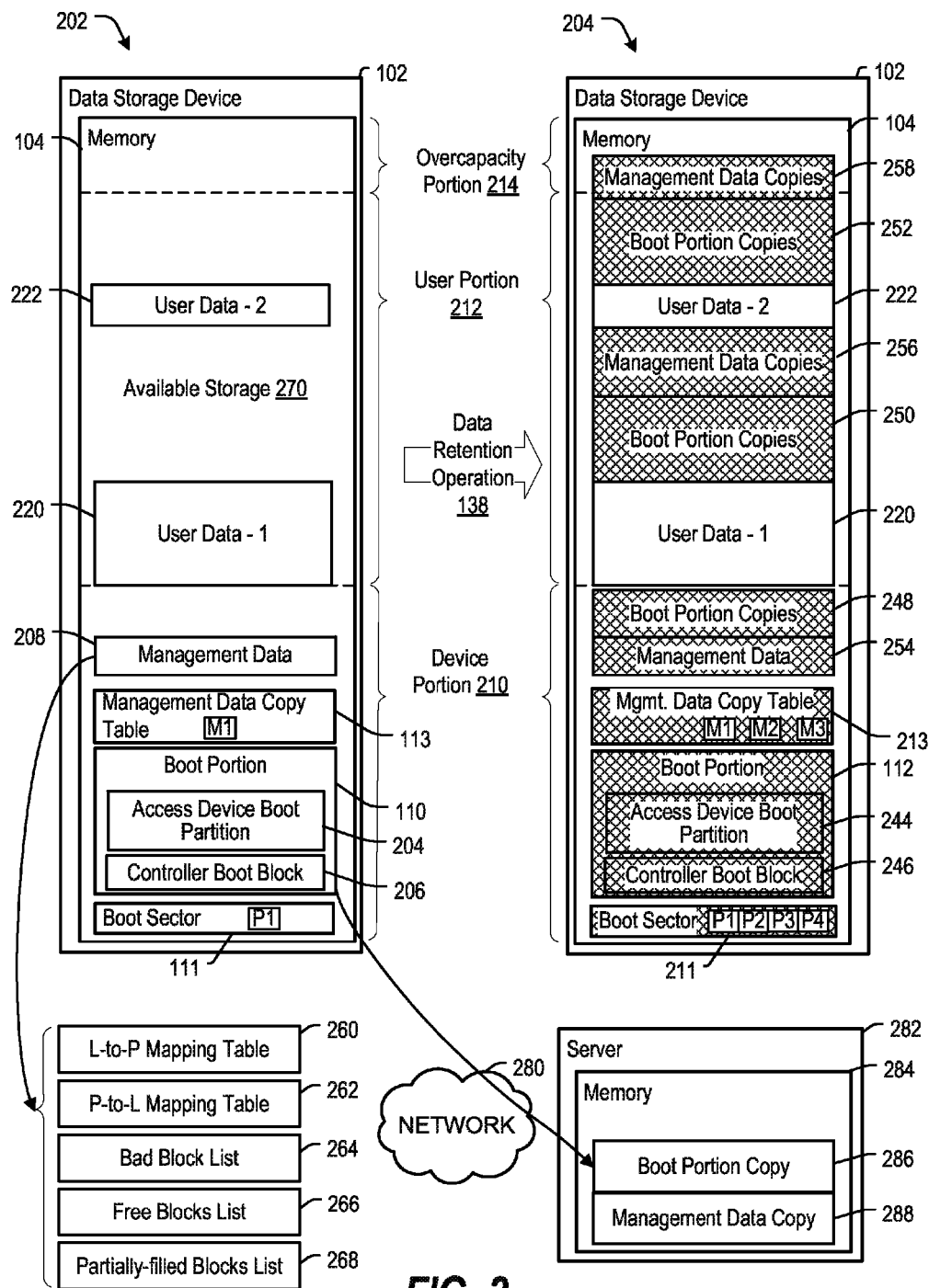
FIG. 2 is a diagram illustrating certain aspects of an example of a data retention operation that may be performed by the data storage device of FIG. 1.

Referring to FIG. 2, a first representation 202 of the data storage device 102 is illustrated showing an example of contents of the memory 104 prior to performance of the data retention operation 138 of FIG. 1. A second representation 204 of the data storage device 102 shows an example of contents of the memory 104 after completion of the data retention operation 138. In the first representation 202, the memory 104 is partitioned (e.g., logically partitioned) into a device portion 210, a user portion 212, and an overcapacity portion 214. The device portion 210 may be dedicated for use by the controller 130 of FIG. 1 for storage of boot data in the boot portion 110 and for storage of management data 208. The user portion 212 may be configured to provide storage for data provided by the accessing device 170, such as first user data 220 and second user data 222. An unused storage capacity of the user portion 212 may be tracked by the controller 130 as available storage 270.

The overcapacity portion 214 may include a section of the memory 104 that is reserved for enabling data transfer operations and other memory operations that may be more efficiently performed when additional storage is available, such as garbage collection and/or wear-leveling data transfer operations. The over capacity portion 214 may be inaccessible to the access device 170 and may constitute a reserve portion of the memory 104. Although the memory 104 is illustrated as divided into distinct contiguous portions 210-214, it should be understood that the memory 104 may be logically divided and that one or more portions of the memory 104, such as physical storage elements arranged in blocks and/or word lines, may be reallocated between the portions 210-214 over the lifetime of the data storage device 102. For example, a particular block of the data storage device 102 may be assigned to the user portion 212 at a particular time, and at a later time the particular block may be re-assigned to the overcapacity portion 214, as an illustrative, non-limiting example.

The boot portion 110 may store data configured to be retrieved and executed during a boot operation. For example, the boot portion 110 may include a controller boot block 206. The controller boot block 206 may store controller boot data that includes executable code and/or data to enable initialization of the controller 130 upon detection of a power up event at the controller 130. The boot portion 110 may also include an access device boot partition 204 that may be configured to store access device boot data that includes executable code and/or data to enable initialization of the processing device 174 of the access device 170 of FIG. 1.

The device portion 210 may also include the boot sector 111, the management data copy table 113, and management data 208. The boot sector 111 may include an address or pointer "P1" corresponding to the boot portion 110. The management data copy table 113 may include an address or pointer "M1" corresponding to the management data 208. The management data 208 may include data that is accessed by the controller 130 to maintain and update a configuration of the data storage device 102. For example, the management data 208 may include one or more logical to physical mapping tables 260, one or more physical to logical mapping tables 262, and/or a list of blocks of the memory 104 that have been determined to not be used, such as a bad block list 264. The management data 208 may include a free blocks list 266 that indicates one or more blocks that have been erased and are available for storage of data. The management data 208 may include one or more other sets of management data, such as a partially-filled blocks list 268. The partially-filled blocks list 268 may include a list of one or more blocks to which some data has been written but that have storage capacity remaining in the block for storage of additional data.

One or more retention copies of contents of the boot sector 111, the boot portion 110, the management data copy table 113, and/or the management data 208 may be written during the data retention operation 138 using adjusted values of write parameters configured to provide enhanced data retention at the memory 104. For example, in the first representation 202 of the data storage device 102, data that has been stored using the first value 146 of the write parameter 142 of FIG. 1 is indicated as blocks having no fill pattern. In the second representation 204, data that has been stored to the memory 104 using the second value 148 of the write parameter 142 is illustrated as blocks having a cross-hatched fill pattern. As illustrated, boot data in the boot portion 110 may be copied, the storage elements of the boot portion 110 may be erased, and the boot data may be re-stored at the storage elements using the second value 148 of the write parameter 142 to generate the retention copy 112 of the boot data, such as a retention copy 246 of controller boot data of the controller boot block 206, and/or a retention copy 244 of access device boot data of the access device boot partition 204. Boot sector data in the boot sector 111 may be copied, the storage elements of the boot sector 111 may be erased, and the boot sector data may be re-stored at the storage elements using the second value 148 of the write parameter 142 to generate a retention copy 211 of the boot sector data that is updated to store an address or pointer "P1" that corresponds to the retention copy 112 of the boot data.

In addition, available storage capacity at the data storage device 102 may be used to store one or more additional retention copies of contents of the boot portion 110 and/or the management data 208. As illustrated, the data retention operation 138 may cause multiple retention copies 254, 256, and 258 of the management data 208 to be stored at the memory 104. A retention copy 213 of data in the management data copy table 113 may also be generated using the second value 148 of the write parameter 142 and may be updated to store an address or pointer "M1" corresponding to the retention copy 254 of the management data 208, an address or pointer "M2" corresponding to the retention copy 256 of the management data 208, and an address or pointer "M3" corresponding to the retention copy 258 of the management data 208. One or more additional retention copies of contents of the boot portion 110 may be stored as boot portion retention copies 248, 250, and 252, and the retention copy 211 of the boot sector data may be updated to include addresses or pointers P2, P3, and P4 corresponding to the retention copies 248, 250, and 252, respectively, of the boot data. As illustrated, the available storage 270 of the user portion 212 may be partially or entirely filled with one or more additional retention copies of the boot portion 110 and/or the management data 208. In addition, at least part of the overcapacity portion 214 may also be used for storage of retention copies of contents of the boot portion 110 and/or the management data 208. The user data 220-222 may remain unmodified and retain its original storage characteristics according to the first value 146 of the write parameter 142.

In some implementations, the data storage device 102 may further be coupled to a network 280, such as a wireless network. For example, the data storage device 102 may include a wireless network interface, such as a wireless data interface within the first interface 132 that enables data read and write operations via the wireless network 280 (e.g., an Institute of Electrical and Electronics Engineers (IEEE) 802.11-type network (e.g., WiFi), or an ad-hoc peer-to-peer local wireless network (e.g., Bluetooth), as illustrative, non-limiting examples). The data storage device 102 may be configured to communicate with a server 282 via the network 280 using wireless messaging that bypasses the accesses device 170. The data retention operation 138 may include sending a copy of contents of the boot portion 110 and/or the management data 208 to the server 282 to be stored as a boot portion copy 286 and/or a management data copy 288 in a memory 284 of the server 282.

The data storage device 102 may be configured to retrieve the controller boot block 246 and/or the access device boot partition 244 from the retention boot portion 112 and/or from one of the other retention copies 248-252 of the boot portion 110 upon startup after an extended period of inactivity. For example, the retention copy 211 of the boot sector data may be read to locate one or more of the retention copies 112, 248, 250, and/or 252 of the boot data. In addition, the data storage device 102 may be configured to retrieve the management data 254 from the device portion 210 or from one of the other retention copies 256-258 of the management data 208. For example, the retention copy 213 of the management data copy table 113 may be read to locate one or more of the retention copies 254, 256, and/or 258 of the boot data. In the event that no retention copies of the boot portion 240 and/or the management data 208 are capable of being used during a startup of the data storage device 102, the data storage device 102 may be configured to access the server 282 via the network 280 to retrieve the boot portion copy 286 and/or the management data copy 288. In some implementations, the access device 170 may be configured to use its boot loader to activate a wireless interface circuit (e.g., a WiFi interface) of the access device 170 to retrieve at least a portion of the access device boot partition data from the boot portion copy 286. In some implementations, the access device 170 may be configured to read at least a portion of the controller boot block data from the boot portion copy 286 (e.g., in a secured and/or encrypted format) and to provide the controller boot block data to the controller 130.

After the boot process of the data storage device 102 and/or the access device 170 has completed, the data storage device 102 may perform one or more "clean up" operations. For example, the data storage device 102 may select another value of the write parameter 142 of FIG. 1, such as returning to the first value 146 or selecting another value for non-retention write operations. The data storage device 102 may optionally refresh or re-write data stored in the device portion 210 and/or user data stored in the user portion 212. Portions of the memory 104 containing the redundant retention copies 248-258 may be marked as unused (e.g., in a file allocation table and/or in the mapping tables 260-262) to restore the available storage 270 and the overcapacity portion 214 for non-retention memory operations.

Figure 3:
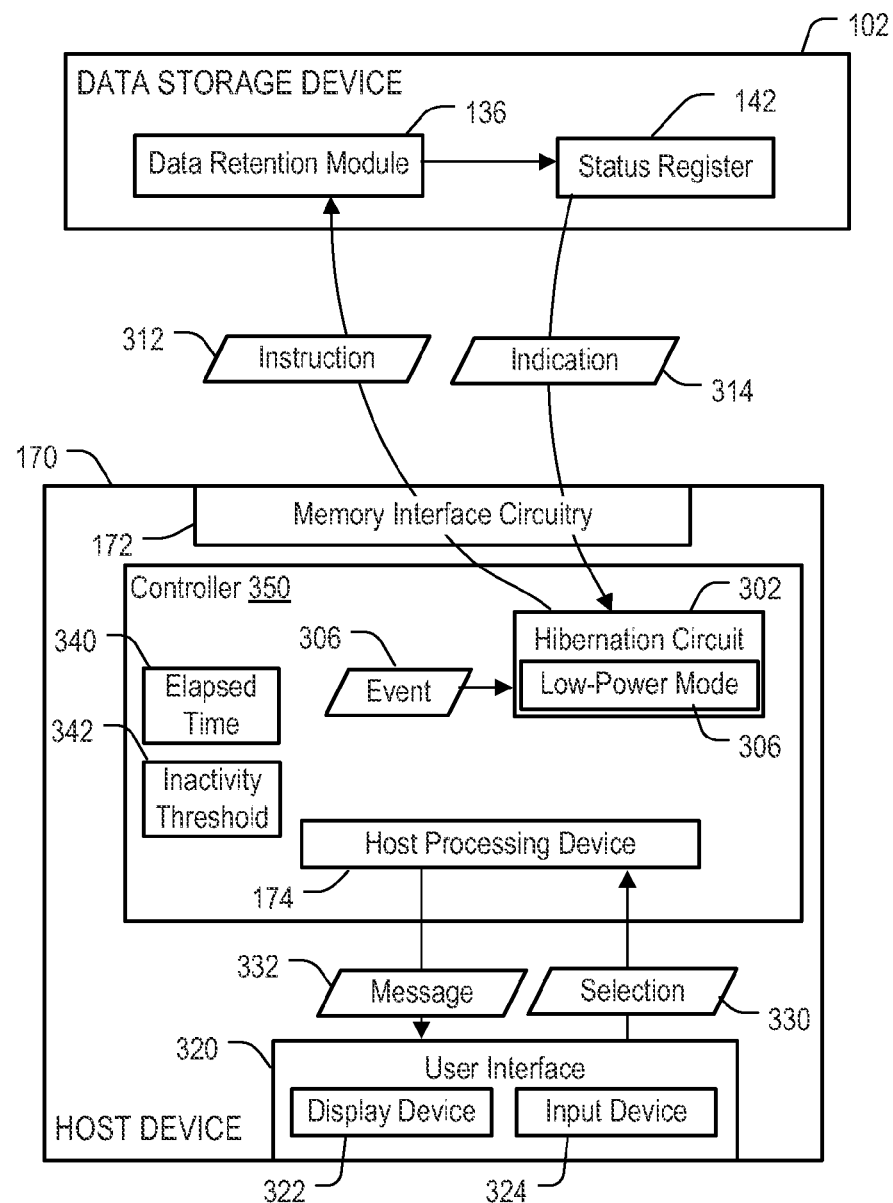
FIG. 3 is a block diagram of an illustrative embodiment of a system including a data storage device that is responsive to an instruction from an access device to perform a data retention operation.

FIG. 3 illustrates a particular implementation of the access device 170 and the data storage device 102 of FIG. 1. The access device 170 may be a host device and may include the memory interface circuitry 172 and the processing device 174 of FIG. 1. The access device 170 may further include a user interface 320, a hibernation circuit 302, and a controller 350 that includes the processing device 174. The hibernation circuit 302 may be configured to detect an event 306 corresponding to a period of inactivity at the access device 170. In response to detecting the event 306, the hibernation circuit 302 is configured to send an instruction 312 via the memory interface circuitry 172 to the data storage device 102. The instruction 312 indicates that a data retention procedure is to be initiated at the data storage device 102. For example, the instruction 312 may be provided to the data retention module 136 to cause the data storage device 102 to initiate the data retention operation 138. The hibernation circuit 302 may further be configured to receive an indication 314 that the data retention procedure has been completed. For example, the hibernation circuit 302 may cause the memory interface circuitry 172 to access an indication 314 (e.g., one or more status bits) from the status register 142 from the data storage device 102 to determine whether the data retention procedure has been completed. In response to receiving the indication 314 that the data retention procedure has been completed, the hibernation circuit 302 may be configured to initiate a transition of the access device 170 to a low power mode 306.

In some implementations, the event 306 may include determining that an elapsed time 340 subsequent to detecting user activity at the access device 170 satisfies a user inactivity threshold 342. For example, the user inactivity threshold 342 may indicate a length of time of inactivity after which the access device 170 may determine that an extended period of time may lapse before a next user activity. In anticipation of an extended period of inactivity, the hibernation circuit 302 may transition the access device 170 to the low power mode 306.

The user interface 320 may include a display device 322 and/or an input device 324. As an illustrative, non-limiting example, the display device 322 may correspond to a liquid crystal device (LCD)-type display or a light-emitting diode (LED)-type display, and the input device 324 may correspond to a physical keyboard and/or a touch screen interface that overlays the display device 322. The controller 350 may be configured to receive, via the user interface 320, a user selection 330 that indicates an impending period of inactivity. For example, a user of the access device 170 may indicate, such as via selection of a menu option that is displayed at the display device 322, that the user intends to initiate a period of inactivity at the access device 170. Receipt of the selection 330 may correspond to the event 306 that causes the hibernation circuit 302 to send the instruction 312. In response to the indication 314 indicating that the data retention operation 138 has been completed, the controller 350 may send a message 332 to be displayed at the display device 322 indicating that the access device 170 is entering a hibernation mode.

By detecting the event 306, such as based on an elapsed time 340 of user inactivity and/or based on the user selection 330 indicating an anticipated period of inactivity, the access device 170 may enhance data retention at the data storage device 102 by sending the instruction 312 and may further provide an indication to the user via the message 332 that a data retention operation has been completed and that the access device 170 and the data storage device 102 are prepared for entering hibernation.

Although FIGS. 1-3 describe performing data retention operations to preserve boot data and/or management data, in some implementations data retention operations may also be performed to better preserve user data in response to a triggering event. For example, the data retention operation 138 may include generating retention copies of all data in the memory 104. As another example, the access device 170 may receive a user selection of particular data (e.g., one or more files or applications) to protect. For example, a user selection of data may be received via the user interface 320 and addresses of the user selected data may be provided to the data retention module 136 to cause the data retention operation 138 to generate one or more retention copies of the user selected data.

Figure 4:
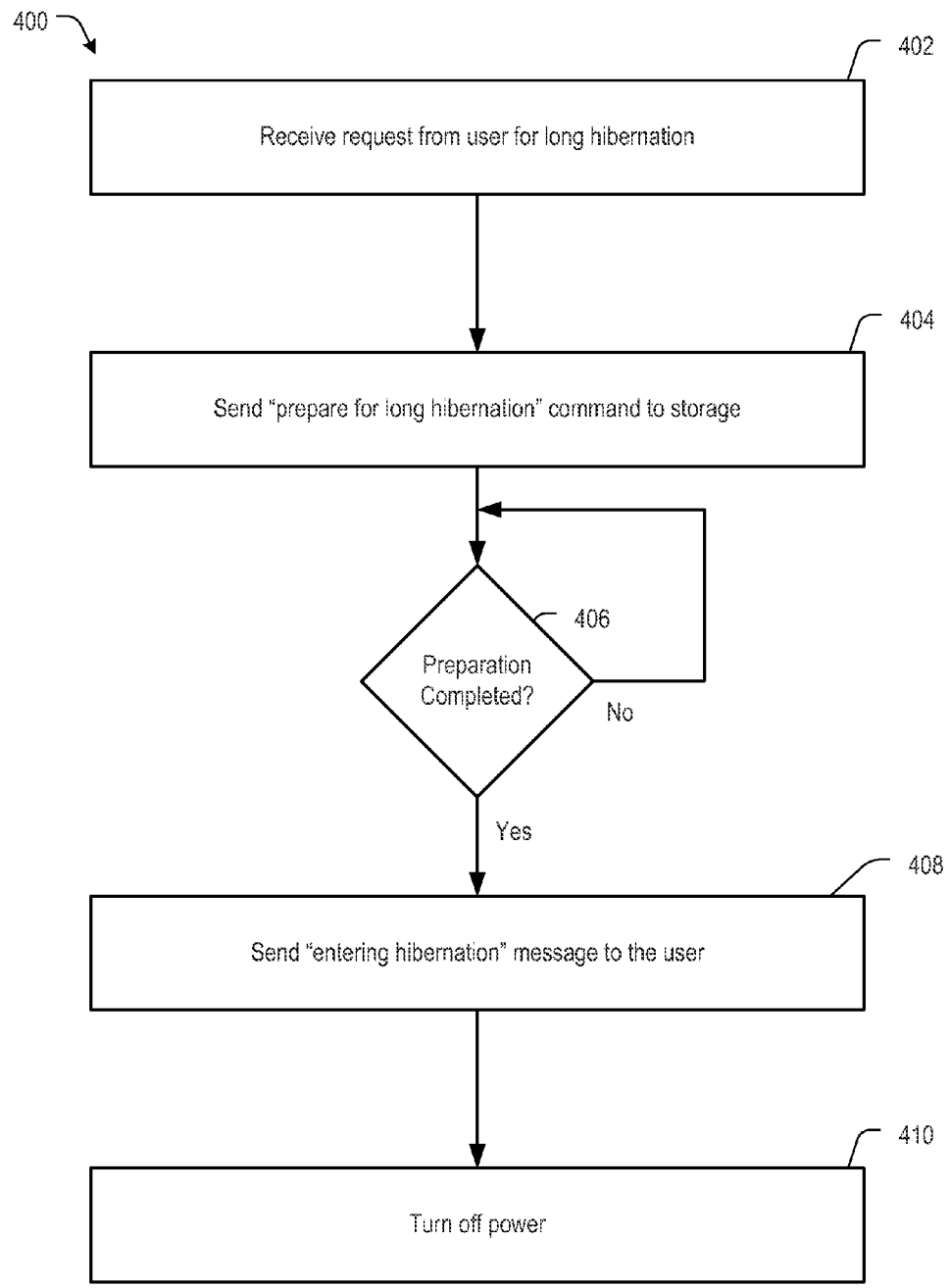
FIG. 4 is a flow diagram of an illustrative embodiment of a method of operating an access device.

FIG. 4 is a flow diagram of an illustrative embodiment of a method 400 of operating an access device. For example, the method 400 may be performed in an access device that is coupled to a data storage device, such as the access device 170 of FIG. 1 or FIG. 3.

The method 400 includes detecting an event corresponding to a period of inactivity at the access device, such as by receiving a user request for a long hibernation of the access device, at 402. In response to detecting the event, an instruction is sent from the access device to the data storage device indicating that a data retention procedure is to be initiated at the data storage device. For example, a "prepare for long hibernation" command may be sent from the access device to the data storage device, at 404.

The access device may determine whether the data storage device preparation for long hibernation has completed, at 406. For example, the access device 170 may access the indication 314 of FIG. 3 from the status register 158 of the data storage device 170 to determine whether the data retention procedure has been completed.

Upon receiving an indication that the data retention procedure has been completed, at 406, the access device may send an "entering hibernation" message to a user of the access device, at 408. For example, in response to receiving the indication 314 that the data retention procedure has been completed, the access device 170 may provide the message 332 to the display device 322 of FIG. 3 indicating that the access device 170 is entering a hibernation mode.

In response to receiving an indication that the data retention procedure has been completed, the access device may transition to a low-power mode. For example, after sending the message, the access device may turn off power, at 410.

Although the method 400 illustrates receiving a user request for long hibernation, one or more additional or alternative techniques for detecting an event corresponding to a period of inactivity may be used by the access device. For example, the event may include determining that an elapsed time subsequent to detecting user activity satisfies a user inactivity threshold, such as by comparing the elapsed time 340 to the user inactivity threshold 342 of FIG. 3.

The access device may provide greater accuracy in detecting the event and instructing the data storage device to prepare for an extended period of inactivity or hibernation than may be achievable by the data storage device (e.g., by detecting voltage changes that exceed the change threshold 156 of FIG. 1). In addition, a user of the device may expressly inform the access device that an extended hibernation period is imminent, and the access device may inform the user when hibernation preparations are complete and that the access device is ready to be powered off. As a result, an improved retention of data at the data storage device may be achieved.

Figure 5:
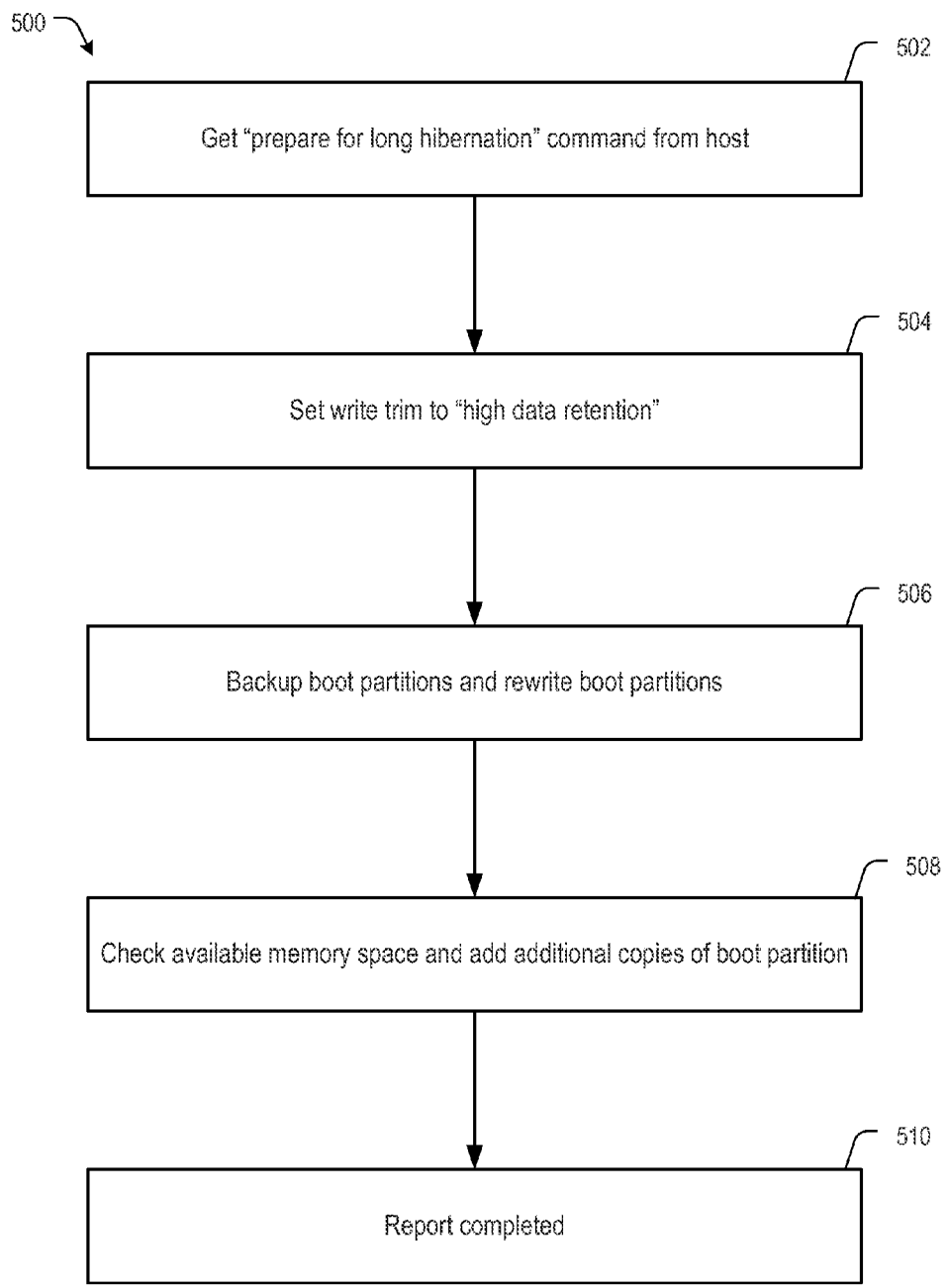
FIG. 5 is a flow diagram of an illustrative embodiment of a method of operating a data storage device.

FIG. 5 is a flow diagram of an illustrative embodiment of a method 500 of operating a data storage device. The method 500 may be performed by a data storage device that is coupled to access device, such as a host device. To illustrate, the method 500 may be performed by the data storage device 102 of FIGS. 1-3.

A "prepare for long hibernation" command may be received from the host device, at 502. For example, the command may correspond to the instruction 312 of FIG. 3. In response to the "prepare for long hibernation" command, a write trim of the data storage device may be set to a "high data retention" value, at 504. The write trim may correspond to values of one or more write parameters, such as one or more read voltages, program verify voltages, program pulse voltages, and/or a number of program pulses, as illustrative, non-limiting examples. To illustrate, setting the write trim to "high data retention" may include changing the write parameter 142 of FIG. 1 from the first value 146 to the second value 148.

A backup of one or more boot partitions may be generated and a re-write of the one or more boot partitions may be performed, at 506. For example, at least one copy of data read from the boot portion 110 of FIGS. 1-2 may be copied to another portion of the memory 104 using the second value 148 of the write parameter 142 (e.g., to create the boot portion retention copy 248 of FIG. 2), the storage elements of the boot portion 110 (e.g., a dedicated portion of the memory 104 starting at physical address "0") may be erased, and the data read from the boot portion 110 may be re-written to the storage elements using the second value 148 of the write parameter 142 (e.g., to generate the retention copy 112 of the boot code 124).

The data storage device may check whether available memory space exists and may add one or more additional copies of the boot partition in the available memory space. For example, the data storage device 102 may determine the available space 270 of FIG. 2 includes sufficient space for one or more additional copies of the boot portion 110. In response to locating sufficient space, the data storage device may store retention copies 250-252 of the boot portion copies 110 of FIG. 2.

The data storage device may report that preparation for long hibernation is completed, at 510. For example, the data storage device 102 may set one or more of the status bits 160 in the status register 158 to the data storage device 102 indicate that the data retention operation 138 is finished. By receiving an instruction to prepare for long hibernation and sending an indication when preparation for long hibernation is completed, the method 500 enables the access device 170 to enter a low-power mode after ensuring that the data storage device 102 is configured for enhanced data retention.

Figure 6:
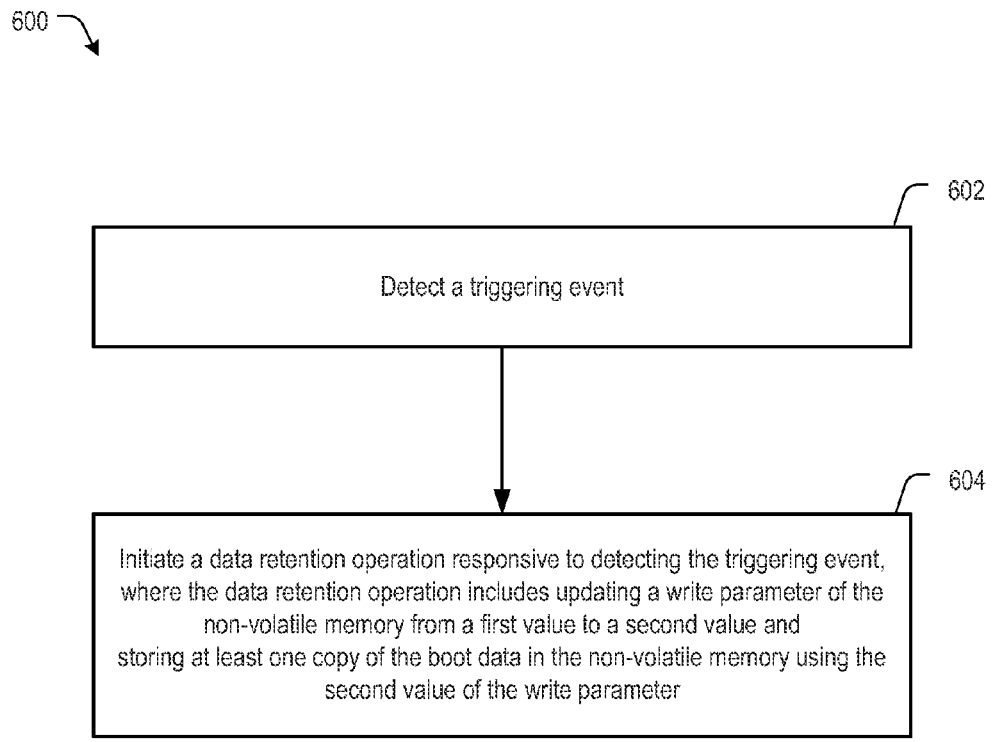
FIG. 6 is a flow diagram of another illustrative embodiment of a method of operating a data storage device.

FIG. 6 is a flow diagram of another illustrative embodiment of a method 600 of operating a data storage device. The method 600 may be performed in a data storage device that includes a controller and a non-volatile memory, where the non-volatile memory includes a boot portion that stores boot data. For example, the method 600 may be performed by the controller 130 of the data storage device 102 of FIGS. 1-3.

The method 600 includes detecting a triggering event, at 602. For example, the data storage device 102 may be coupled to the access device 170, and the triggering event may include receiving the instruction 312 from the access device 170 to initiate the data retention operation 138. As another example, the non-volatile memory may store the reference data 114, and the triggering event may correspond to detecting that a change in the reference data 114 exceeds the change threshold 156.

Responsive to detecting the triggering event, a data retention operation is initiated, at 604. The data retention operation includes updating a write parameter of the non-volatile memory from a first value to a second value and storing at least one copy of the boot data in the non-volatile memory using the second value of the write parameter. For example, the write parameter may include at least one of a voltage level that indicates a program state of a storage element of the non-volatile memory (e.g., the read voltage 150), a number of program pulses used to set the program state of the storage element (e.g., the number of program pulses 154), and/or a program voltage level of each program pulse (e.g., the program voltage 152).

The boot portion may include at least one of an access device boot partition or a controller boot block, such as the access device boot partition 204 and the controller boot block 206, respectively, of FIG. 2. The non-volatile memory may also include management data, such as the management data 208 of FIG. 2. The data retention operation may include storing at least one copy of the management data in the non-volatile memory using the second value of the write parameter, such as the multiple retention copies 254, 256, and 258 of the management data 208 of FIG. 2.

The data retention operation may also include rewriting the boot portion by reading data from the at least one copy of the boot data and storing the data in the boot portion using the second value of the write parameter, such as the retention copy 112 illustrated in FIG. 2. In addition, or alternatively, the data retention operation may further include storing one or more additional copies of the boot data, such as the boot portion retention copies 248-252 of FIG. 2, in response to determining that an amount of unused storage capacity in the non-volatile memory satisfies a threshold.

Storing the at least one copy of the boot portion using the second value of the write parameter may enable enhanced data retention of the at least one copy of the boot data in the non-volatile memory during an extended period of inactivity as compared to data retention of the boot data stored in the non-volatile memory using the first value of the write parameter. As a result, the first value of the write parameter may be used during normal operation to achieve enhanced performance and endurance of the data storage device, and the second value of the write parameter may be used in preparation for a period of non-use to enhance data retention at the non-volatile memory.

Although the data retention module 136 and certain other components described herein are illustrated as block components and described in general terms, such components may include one or more microprocessors, state machines, and/or other circuits configured to enable the data storage device 102 (or one or more components thereof) to perform operations described herein. Components described herein may be operationally coupled to one another using one or more nodes, one or more buses (e.g., data buses and/or control buses), one or more other structures, or a combination thereof. One or more components described herein may include one or more physical components, such as hardware controllers, state machines, logic circuits, one or more other structures, or a combination thereof, to enable the data storage device 102 to perform one or more operations described herein.

Alternatively or in addition, one or more aspects of the data storage device 102 may be implemented using a microprocessor or microcontroller programmed (e.g., by executing instructions) to perform operations described herein, such as one or more operations of the method 500 and/or the method 600. To illustrate, the data retention module 136 may be executed by a processor in the controller 130 to detect a signal corresponding to the triggering event 136, such as by comparing an identifier of the instruction 312 of FIG. 3 to a data retention instruction identifier. In response to detecting that the identifier of the instruction 312 matches a data retention instruction identifier, the processor may retrieve a list of physical addresses corresponding to the boot portion 110 (e.g., from the boot sector 111), send the second value 148 of the write parameter to the memory device 103, and initiate reading, error correction, and storage of data from the listed physical addresses. Upon completion of storing data of a last listed physical address, the processor may write a bit value to the status register 158 to indicate completion of the data retention operation 138. In a particular embodiment, the data storage device 102 includes a processor executing instructions (e.g., firmware) retrieved from the memory 104. Alternatively or in addition, instructions that are executed by the processor may be retrieved from a separate memory location that is not part of the memory 104, such as at a read-only memory (ROM).

The data storage device 102 may be coupled to, attached to, or embedded within one or more accessing devices, such as within a housing of the access device 170. For example, the data storage device 102 may be embedded within the access device 170 in accordance with a Joint Electron Devices Engineering Council (JEDEC) Solid State Technology Association Universal Flash Storage (UFS) configuration. To further illustrate, the data storage device 102 may be integrated within an electronic device (e.g., the access device 170), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 may be implemented in a portable device configured to be selectively coupled to one or more external devices, such as a host device. For example, the data storage device 102 may be removable from the access device 170 (i.e., "removably" coupled to the access device 170). As an example, the data storage device 102 may be removably coupled to the access device 170 in accordance with a removable universal serial bus (USB) configuration.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the access device 170 via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to the access device 170 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-1C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The memory 104 may include a three-dimensional (3D) memory, such as a resistive random access memory (Re-RAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively or in addition, the memory 104 may include another type of memory. In a particular embodiment, the data storage device 102 is indirectly coupled to an accessing device (e.g., the access device 170) via a network. For example, the data storage device 102 may be a network-attached storage (NAS) device or a component (e.g., a solid-state drive (SSD) component) of a data center storage system, an enterprise storage system, or a storage area network. The memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
a data storage device including a controller and a non-volatile memory,
wherein the non-volatile memory includes a data structure that stores data, performing by the controller:
detecting a triggering event that indicates an extended period of inactivity of the data storage device by testing at least one storage element for a change in a programmed voltage occurring over a time of programming to a time of the testing exceeds a change threshold; and
responsive to detecting the triggering event, initiating a data retention operation, wherein the data retention operation includes:
adjusting a write parameter of the non-volatile memory from a first value to a second value; and
storing at least one copy of the data in the non-volatile memory using the second value of the write parameter,
wherein the write parameter includes at least one of a voltage level that indicates a program state of a storage element, a number of program pulses used to set a program state of the storage element, or a program voltage level of each program pulse.

2. The method of claim 1, wherein storing the at least one copy of the data using the second value of the write parameter enables enhanced data retention of the at least one copy of the data in the non-volatile memory during an extended period of inactivity as compared to data retention of data stored in the non-volatile memory using the first value of the write parameter.

3. The method of claim 1, wherein the data storage device is coupled to an access device, and wherein the triggering event further includes receiving an instruction from the access device to initiate the data retention operation.

4. The method of claim 1, wherein the non-volatile memory stores reference data, and wherein the write parameter is updated in response to the controller detecting that a change in the reference data exceeds a change threshold.

5. The method of claim 1, wherein the data structure includes at least one of an access device boot partition or a controller boot block.

6. The method of claim 1, wherein the non-volatile memory includes management data, and wherein the data retention operation further includes storing at least one copy of the management data in the non-volatile memory using the second value of the write parameter.

7. The method of claim 6, wherein the management data includes at least one of logical address to physical address mapping data, physical address to logical address mapping data, a bad block list, a free blocks list, or a partially-filled blocks list.

8. The method of claim 1, wherein the data retention operation further includes rewriting the data structure by reading data from the at least one copy of the data and storing the data in the data structure using the second value of the write parameter.

9. The method of claim 1, wherein the data retention operation further includes storing one or more additional copies of the data in response to determining that an amount of unused storage capacity in the non-volatile memory satisfies a threshold.

10. The method of claim 1, wherein the data structure includes at least a boot portion, and wherein the data includes boot data.

11. A data storage device comprising:
a non-volatile memory having a data structure that is configured to store data of at least one of a controller or an access device; and
the controller operatively coupled to the non-volatile memory, wherein the controller includes a data retention module that is configured to detect a triggering event and initiate a data retention operation in response to detecting the trigger event that indicates an extended period of inactivity of the data storage device by testing at least one storage element for a change in a programmed voltage occurring over a time of programming to a time of the testing exceeds a change threshold, wherein the data retention operation includes updating a write parameter of the non-volatile memory from a first value to a second value and initiating storage of at least one copy of the data in the non-volatile memory using the second value of the write parameter, wherein the write parameter includes at least one of a voltage level that indicates a program state of the at least one storage element, a number of program pulses used to set the program state of the at least one storage element, or a program voltage level of each program pulse.

12. The data storage device of claim 11, wherein the data retention module is configured with a hibernation circuit.

13. The data storage device of claim 11, further comprising a status register, wherein the triggering event includes receiving an instruction from the access device to initiate the data retention operation, and wherein the data retention module is further configured to set a status bit of the status register to a particular value subsequent to storage of the at least one copy of the data.

14. The data storage device of claim 11, wherein, while the controller is operatively coupled to a network, the data retention module is further configured to:
read data from the data structure; and
send the data to a server of the network.

15. The data storage device of claim 11, wherein the data structure includes at least a boot portion, and wherein the data includes boot data.

16. A method comprising:
in a data storage device including a controller and a non-volatile memory, performing:
receiving an instruction from an access device that indicates an extended period of inactivity of the data storage device based on testing at least one storage element for a change in a programmed voltage occurring over a time of programming to a time of the testing exceeds a change threshold;
initiating a data retention procedure of the non-volatile memory in response to receiving the instruction; and
updating a status register value to indicate completion of the data retention procedure, wherein the data retention procedure includes:
adjusting a write parameter of the non-volatile memory from a first value to a second value; and
storing, using the second value of the write parameter, at least one copy of data read from a data structure in the non-volatile memory, wherein the write parameter includes at least one of a voltage level that indicates a program state of the at least one storage element, a number of program pulses used to set the program state of the at least one storage element, or a program voltage level of each program pulse.

17. The method of claim 16, wherein the data structure includes at least one of an access device boot partition or a controller boot block.

18. A method comprising:
in an access device that is coupled to a data storage device, performing:
detecting an event corresponding to a period of inactivity at the access device by testing at least one storage element for a change in a programmed voltage occurring over a time of programming to a time of the testing exceeds a change threshold; and
in response to detecting the event, sending an instruction from the access device to the data storage device indicating that a data retention procedure is to be initiated at the data storage device, wherein the data retention procedure includes:
adjusting a write parameter of a non-volatile memory of the data storage device from a first value to a second value; and
storing at least one copy of data in the non-volatile memory using the second value of the write parameter, wherein the write parameter includes at least one of a voltage level that indicates a program state of a the at least one storage element, a number of program pulses used to set the program state of the at least one storage element, or a program voltage level of each program pulse.

19. The method of claim 18, further comprising accessing an indication from a status register of the data storage device to determine whether the data retention procedure has been completed.

20. The method of claim 18, further comprising, in response to receiving an indication that the data retention procedure has been completed, transitioning the access device to a low-power mode.

21. The method of claim 18, further comprising, in response to receiving an indication that the data retention procedure has been completed, providing a message to a display device indicating that the access device is entering a hibernation mode.

22. The method of claim 18, wherein detecting the event includes receiving a user selection indicating the period of inactivity.

23. The method of claim 18, wherein the event includes determining that an elapsed time subsequent to detecting user activity satisfies a user inactivity threshold.

24. An access device comprising:
a memory interface; and
a controller including a hibernation circuit, the hibernation circuit configured to detect an event corresponding to a period of inactivity at the access device by testing at least one storage element for a change in a programmed voltage occurring over a time of programming to a time of testing that exceeds a change threshold, and to send an instruction, via the memory interface, to a data storage device in response to detecting the event, wherein the instruction indicates that a data retention procedure is to be initiated at the data storage device, wherein the data retention procedure includes:
adjusting a write parameter of a non-volatile memory of the data storage device from a first value to a second value; and
storing at least one copy of data in the non-volatile memory using the second value of the write parameter, wherein the write parameter includes at least one of a voltage level that indicates a program state of the at least one storage element, a number of program pulses used to set the program state of the at least one storage element, or a program voltage level of each program pulse.

25. The access device of claim 24, wherein the hibernation circuit is further configured to, in response to receiving an indication that the data retention procedure has been completed, initiate a transition of the access device to a low-power mode.

26. The access device of claim 24, wherein the hibernation circuit is further configured to access an indication from a status register of the data storage device to determine whether the data retention procedure has been completed.

* * * * *